United States Patent
Huth

[11] Patent Number: 5,874,738
[45] Date of Patent: Feb. 23, 1999

[54] SCINTILLATION CRYSTAL MODULES AND METHODS OF MAKING THE SAME

[75] Inventor: Scott T. Huth, Norton, Ohio

[73] Assignee: Saint-Gobain Industrial Ceramics, Inc., Worcester, Mass.

[21] Appl. No.: 879,961

[22] Filed: Jun. 20, 1997

Related U.S. Application Data

[60] Provisional application No. 60/021,846 Jul. 16, 1996.
[51] Int. Cl.$^6$ ...................................................... G01T 1/161
[52] U.S. Cl. ........................................................ 250/363.02
[58] Field of Search ......................................... 250/363.02

[56] References Cited

U.S. PATENT DOCUMENTS

| | | |
|---|---|---|
| 4,004,151 | 1/1977 | Novak . |
| 5,148,029 | 9/1992 | Persyk et al. . |
| 5,521,385 | 5/1996 | Pandelisev ......................... 250/363.02 |

FOREIGN PATENT DOCUMENTS 0 303 730 A2   2/1989   European Pat. Off. .

*Primary Examiner*—Constantine Hannaher
*Attorney, Agent, or Firm*—Volker R. Ulbrich

[57] ABSTRACT

A scintillation crystal module having an epoxy seal which has a coefficient of thermal expansion which is substantially the same as the backcap of the gamma camera. Among the suitable epoxy systems, the CTE of the epoxy could be modified somewhat by choosing a different catalyst or by adjusting the resin:catalyst ratio. The presently preferred epoxy system is a STYCAST® 2850 FT system available from W. R. Grace & Co. Using "catalyst 9" or "catalyst 11" from that system, a CTE of approximately $17.33 \times 10^{-6}$ to approximately $19.4 \times 10^{-6}$ in/in° F. can be easily achieved. It has been discovered through analysis using FEA that an epoxy with a CTE in the range of 9.0 to $20.0 \times 10^{-6}$ in/in° F. provides satisfactory results in preventing seal separation during ±40° F. temperature cycles. A method of making a scintillation crystal module includes the preparation of an epoxy seal having a coefficient of thermal expansion which is substantially the same as the backcap of the module, and assembling the seal, backcap, glass, and crystal in a conventional manner.

10 Claims, 6 Drawing Sheets

SCINTILLATION CRYSTAL MODULES AND METHODS OF MAKING THE SAME

This application claims the benefit of U. S. Provisional Application(s) No.(s).: 60/021,846 filed Jul. 16, 1996.

BACKGROUND OF THE INVENTION

1. Field of the Invention

The invention relates to scintillation crystal modules. More particularly, the invention relates to a scintillation crystal module having an improved seal (adhesive gasket cement) which maintains hermeticity after exposure to repeated thermal cycling.

2. State of the Art

Scintillation crystal modules or "gamma cameras" are widely used in nuclear medicine to non-invasively observe the interior of the human body. A gamma camera generally includes a single relatively large scintillation crystal, typically about sixteen inches by eighteen inches, and an array of photo-detectors optically coupled to the crystal. A source of gamma radiation (e.g. an isotope) is introduced into a patient's body and the gamma camera is placed against the patient's body. As gamma rays are emitted from the isotope, they pass through the body of the patient and strike different areas of the crystal causing it to release photons (i.e. emit light). The array of photo-detectors senses the relative brightness of light emitted from different parts of the crystal. Signals from the detector array may be processed in different ways to obtain either a two dimensional representation of the location of the isotope or an image of the region where the isotope is located.

Gamma cameras are relatively expensive, costing on the order of $50,000. Moreover, the scintillation crystal is extremely hygroscopic and it deteriorates quickly if exposed to moisture. Therefore, the crystal must be housed in a casing which will protect it from moisture, yet still permit gamma rays to excite the crystal and permit light from the crystal to be detected by an array of photo detectors.

A state of the art gamma camera is shown in prior art FIGS. 1 and 2. The camera 10 generally includes a scintillation crystal 12, typically thallium doped sodium iodide, an aluminum casing (or backcap) 14, a glass window 16, typically soda lime (K+ glass or PYREX), and an epoxy seal 18. The crystal 12 is adhered to the glass 14 by a layer of gel 20 having an index of refraction close to that of the glass. The epoxy seal 18 forms an hermetic seal between the glass 16 and the casing 14 to protect the crystal 12 from moisture. An array 22 of photo-detectors is coupled to the glass window 16. In use, electrical outputs (not shown) from the array 22 are coupled to an image processor (not shown). The aluminum casing 14 is relatively thin (approximately 0.040") so that it has a low gamma ray absorption.

A problem common to all known gamma cameras is that the epoxy seal 18 is significantly weakened if the camera 10 is exposed to extreme temperature cycles. While such exposure and consequent weakening of the seal does not normally result in immediate hydration of the crystal, it does significantly shorten the useful life of the crystal. Most gamma cameras in use today have a useful life of one to two years. As the camera ages and the seal is weakened, the crystal becomes cloudy as it is hydrated, and its performance is reduced until it is unsuitable for imaging purposes.

It is generally understood in the art that the coefficient of thermal expansion (CTE) of the aluminum casing is very different from the CTE of the glass window. The CTE of the K+ glass is approximately $5\times10^{-6}$ in/in° F. and the CTE of the aluminum casing is approximately $13.3\times10^{-6}$ in/in° F. It is also understood that this difference in the CTEs causes the glass and the aluminum to move relative to each other when the ambient temperature changes. It is generally believed that this movement induces stress on the epoxy seal and causes it to separate from the glass and/or the aluminum. If the ambient temperature change is sufficient (e.g. 40° F.), the bond between the epoxy and the glass or the aluminum indeed can be broken. A 40° F. change in ambient temperature is not uncommon when a gamma camera is being shipped to a location for use. Thus, many gamma cameras may actually be damaged before their initial use. As mentioned above, damage to the epoxy seal does not usually result in catastrophic failure of the camera crystal. However, as mentioned before, the crystal often begins a slow process of hydration after the initial damage to the seal.

The general understanding of the effects of thermal expansion on gamma cameras is illustrated in FIG. 3. Since the CTE of the backcap 14 is approximately 2.7 times that of the glass 16, for a given change in temperature, the backcap 14 will expand or contract approximately 2.7 times as much as the glass 16. FIG. 3 shows the relative positions of backcap 14 and the glass 16 at 70° F. The phantom lines 14a, 16a show the relative positions of the backcap 14 and the glass 16 at 40° F. The general understanding in the art, therefore, is that when the camera is cooled, the seal 18 is subjected to compression forces by the contracted backcap 14. Similarly, it is generally believed that when the camera is heated, the seal 18 is subjected to tensile forces as the space between the glass and the backcap increases.

Recognizing the effects of thermal expansion, several solutions have been proposed by those skilled in the art to reduce the stress exerted on the seal. Traditionally, the approach to increase seal performance was focused in two areas. The first approach involved the use of an epoxy with a higher tensile strength or lower elastic modulus (softer). The second approach attempted to reduce the difference, or mismatch, between the CTE of the backcap and the CTE of the glass window. It was believed that if the CTE of the glass and the CTE of the backcap could be closely matched, the stresses in the seal during temperature cycling could be drastically reduced. This second approach was never successfully implemented due to the limited availability of suitable materials and the difficulty of manufacturing a camera from materials other than aluminum. The current aluminum backcaps provide low gamma ray absorption by using 0.040" thick aluminum. Aluminum of this thickness is rigid enough to avoid damage during handling, and is easy to manufacture with hydroforming techniques. While a steel backcap would have a CTE more closely matched to glass, the thickness of a steel backcap would have to be reduced to 0.005" in order to maintain an acceptable level of gamma ray attenuation. Such thin steel would not be as durable as the thicker aluminum and would not be easy to manufacture.

More recently, efforts have been made to engineer the geometry of the seal and the aluminum casing to reduce the stress imparted on the seal. U.S. Pat. No. 5,148,029 to Persyk et al. discloses a gamma camera having an inner seal and an outer seal. The Persyk et al. disclosure is based on the assumption that the separation of the seal from the glass and/or the casing is "because the aluminum casing and the glass window have significantly different thermal expansion coefficients and the forces which are generated during temperature changes cause the seal to break free of the parts to which it is attached."

U.S. Pat. No. 5,229,613 to Pandelisev et al. discloses a gamma camera constructed from a stainless steel ring within which an x-ray window, a scintillation crystal, and a PYREX optical window are arranged. The two windows are sealed to the steel ring by laser welding or soldering using an Indium-Tin alloy or other suitable material. An annular cut is provided in the steel ring surrounding the optical window "to provide thermal relief to the outer ring and the transparent plate" and it is filled with a rubber filler. Rubber filler is also provided between the x-ray window and the steel ring. This complex camera avoids the use of an epoxy seal, but is still based on the assumption that the comparative thermal properties of the glass and the casing are the cause of seal separation.

SUMMARY OF THE INVENTION

It is therefore an object of the invention to provide a scintillation crystal module having an improved hermetic seal.

It is also an object of the invention to provide a method of making a scintillation crystal module with an improved hermetic seal.

It is another object of the invention to provide a scintillation crystal module having an improved seal which is easy to manufacture.

In accord with these objects which will be discussed in detail below, the present invention is based on the discovery that the differences in thermal expansion characteristics of aluminum and glass are not the primary source of gamma camera seal separation. Rather, the inventor has discovered that the difference in the thermal expansion characteristics of the epoxy seal and the aluminum backcap is the critical factor in determining the mechanical stresses imposed on the seal during temperature cycling. Thus, the invention provides a scintillation crystal module with an epoxy seal having a coefficient of thermal expansion which is substantially the same as the backcap.

Based on the understanding of the invention, several epoxy systems were investigated. The presently preferred epoxy system is a STYCAST® 2850 FT system available from W. R. Grace & Co. Using "catalyst 9" or "catalyst 11" of that system, a CTE of approximately $17.33 \times 10^{-6}$ to approximately $19.4 \times 10^{-6}$ in/in° F. can be easily achieved.

Additional objects and advantages of the invention will become apparent to those skilled in the art upon reference to the detailed description taken in conjunction with the provided figures.

DETAILED DESCRIPTION OF THE PREFERRED EMBODIMENTS

In order to prove or disprove the state of the art assumptions regarding the effects of thermal expansion on a gamma camera seal, a Finite Element Analysis model was created using the physical properties of a conventional glass, backcap and epoxy seal. The model assumed an 18"×14" rectangular gamma camera assembly consisting of K+ glass and a 0.040" thick aluminum backcap. In constructing the analysis, it was determined that the CTE of a conventional epoxy seal (e.g. ECCOBOND 45, Catalyst 15) is approximately $43 \times 10^6$ in/in° F., more than eight times that of the glass and more than three times that of the backcap. Thus, it was hypothesized that the CTE of the seal may be a more critical factor than had been previously understood in the art.

Figure 1:
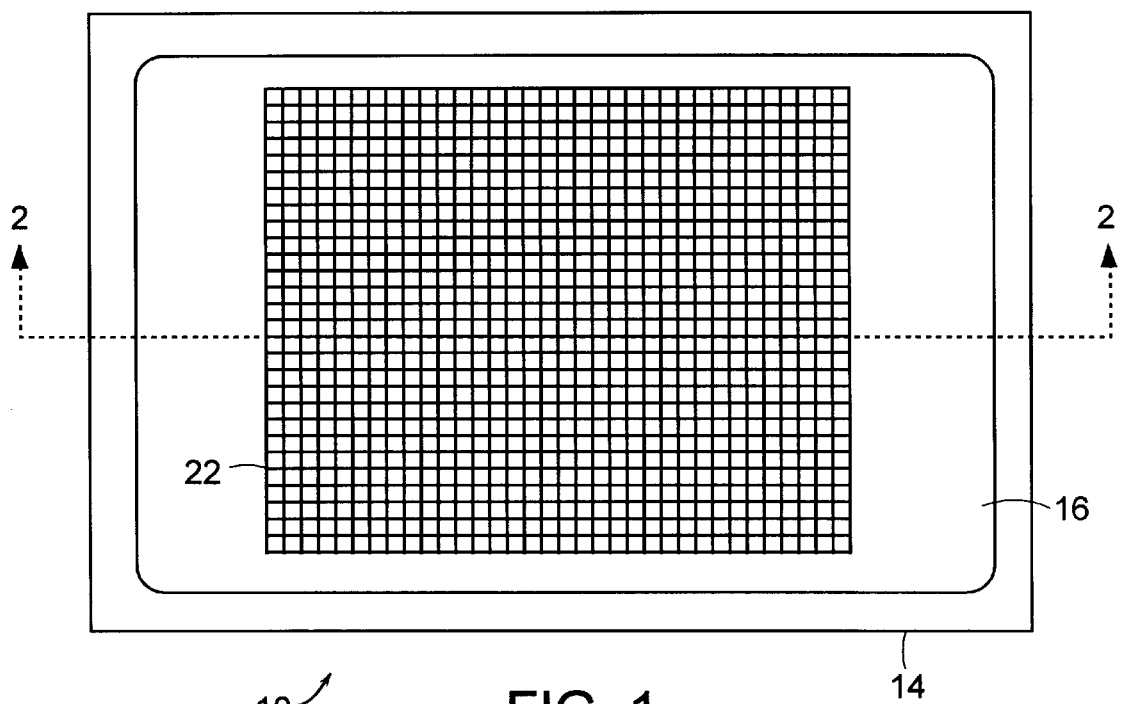
FIG. 1 is a top plan view of a prior art scintillation camera.
Figure 2:
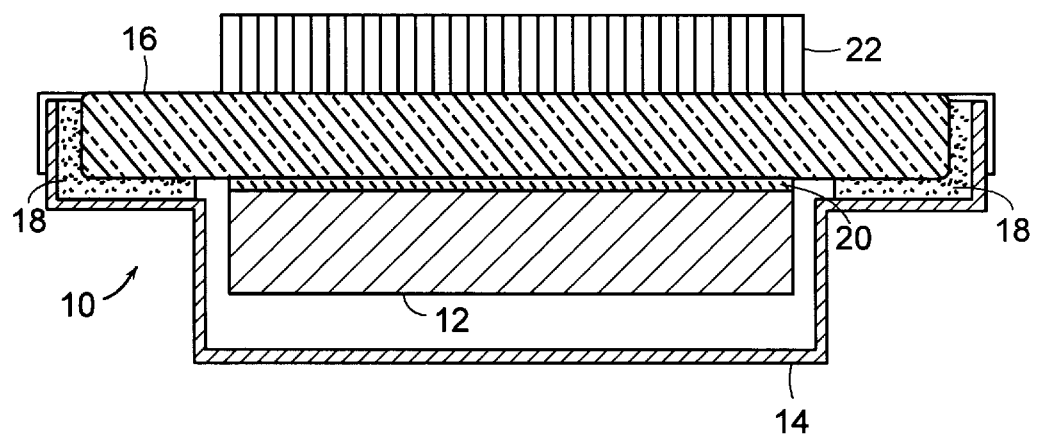
FIG. 2 is a cross sectional view of the scintillation camera taken along lines 2—2 in FIG. 1.
Figure 3:
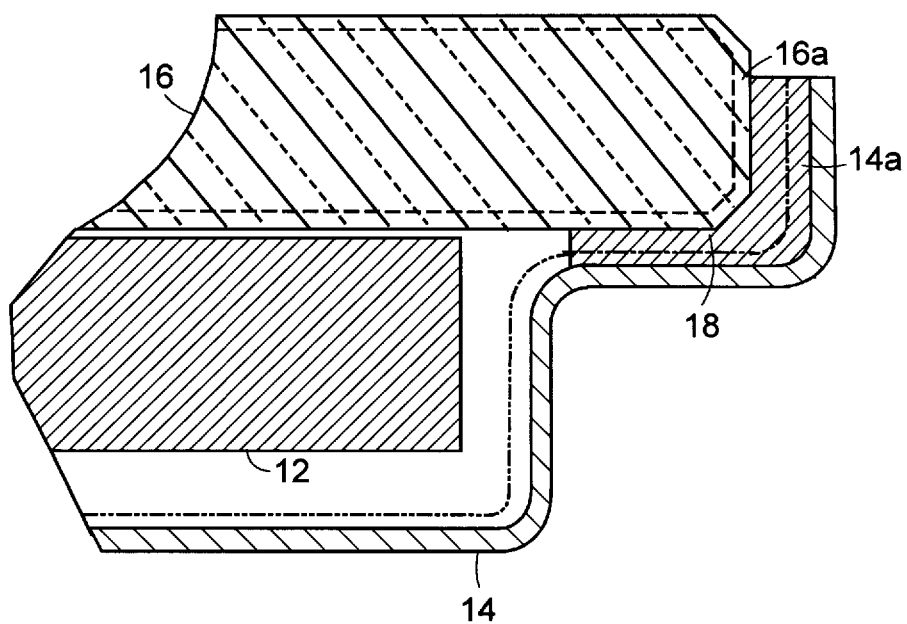
FIG. 3 is a broken sectional view, similar to FIG. 2 where phantom lines show the expected positions of the glass and the backcap after cooling by 40° F.
Figure 4:
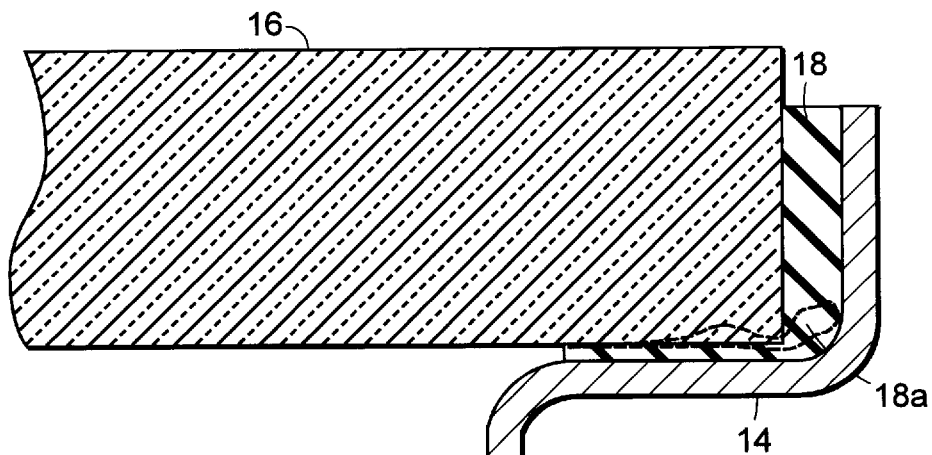
FIG. 4 is an image generated by Finite Element Analysis of a conventional scintillation crystal module with an aluminum backcap subjected to a temperature change of −40° F.

Referring now to FIG. 4, the results of the Finite Element Analysis show that, contrary to the state of the art assumptions, the seal 18 is subjected to tensile forces when the camera is cooled from 70° F. to 30° F. (a change of −40° F.). In particular, since the seal 18 contracts much more than the backcap 14, a band of tension is created along the lower portion 18a of the seal 18 where it interfaces with the backcap 14. The maximum stress was measured at 796 psi. The analysis depicted in FIG. 4 suggests that the difference in the CTE of the epoxy seal 18 is much more significant than the difference between the CTE of the backcap 14 and the CTE of the glass 16 in causing stress on the seal during temperature cycling. In addition to the tendency of the seal 18 to separate from the backcap 14, the tensile stresses exerted by the seal 18 cause a deformation of the backcap 14. The level of deformation of the backcap 14 is inversely proportional to the stiffness of the backcap. In tests of ECCOBOND 45, tensile stress was exhibited at the bottom of the backcap when exposed to cold temperatures and at the top of the back cap when exposed to hot temperatures.

Figure 5:
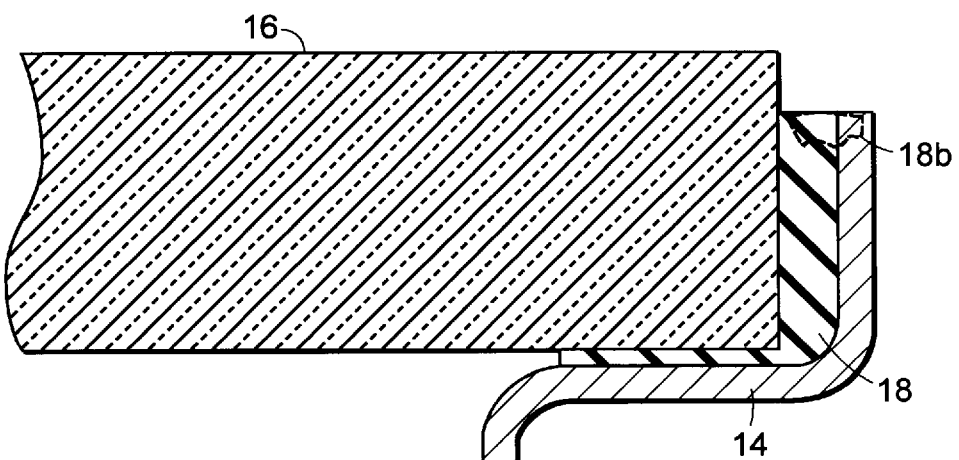
FIG. 5 is an image generated by Finite Element Analysis of a conventional scintillation crystal module with an aluminum backcap subjected to a temperature change of +40° F.

A second analysis was performed using the same data as the analysis depicted in FIG. 4, but raising the ambient temperature of the camera model from 70° F. to 110° F. (a change of +40° F.). The results of the second analysis are depicted in FIG. 5. Here it was observed that tensile stress developed at the upper portion 18b of the epoxy seal 18 where it interfaces with the glass 16. It will be appreciated that the epoxy seal is a continuous rectangular (or circular) bead and that it expands linearly when heated. Thus, as seen in the analysis depicted in FIG. 5, the perimeter of the seal increases more than the perimeter of the glass, resulting in the tensile stress at the epoxy-glass interface. A compression steress is also exhibited between the epoxy and the backcap in the areas having a negative value in FIG. 5.

Figure 6:
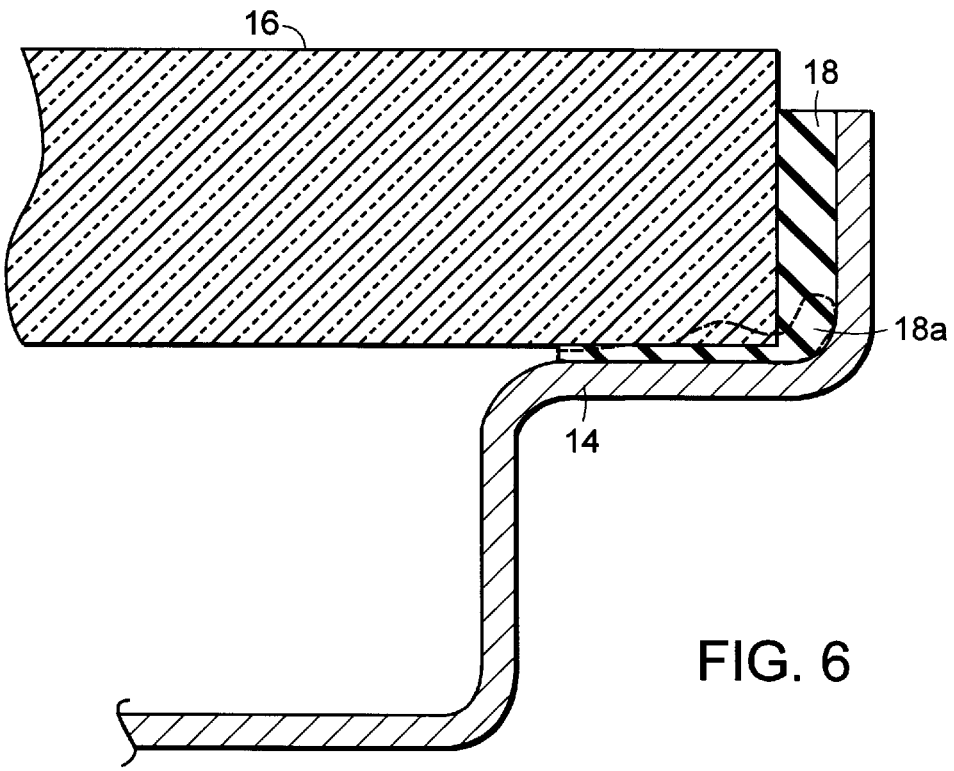
FIG. 6 is an image generated by Finite Element Analysis of a conventional scintillation crystal module with a steel backcap subjected to a temperature change of −40° F.

In order to further test the state of the art assumptions, the analysis of FIG. 4 was repeated with data altered to change the CTE of the backcap to match the CTE of the glass. The results of this third analysis are depicted in FIG. 6. While the state of the art assumption was that the difference in CTE of the backcap 14 and the glass 16 was the cause of seal separation, the analysis of FIG. 6 shows this assumption to be incorrect. If the CTE of the backcap 14 is reduced to that of the glass 16, the epoxy seal 18 tends to separate even more from the backcap 14 when the camera is cooled. Greater tensile stress develops along the lower portion 18a of the seal 18 where it interfaces with the backcap 14. Decreased stress is exhibited in the lower leg of the backcap, however, because of the closer matching CTE of the glass and the backcap.

Figure 7:
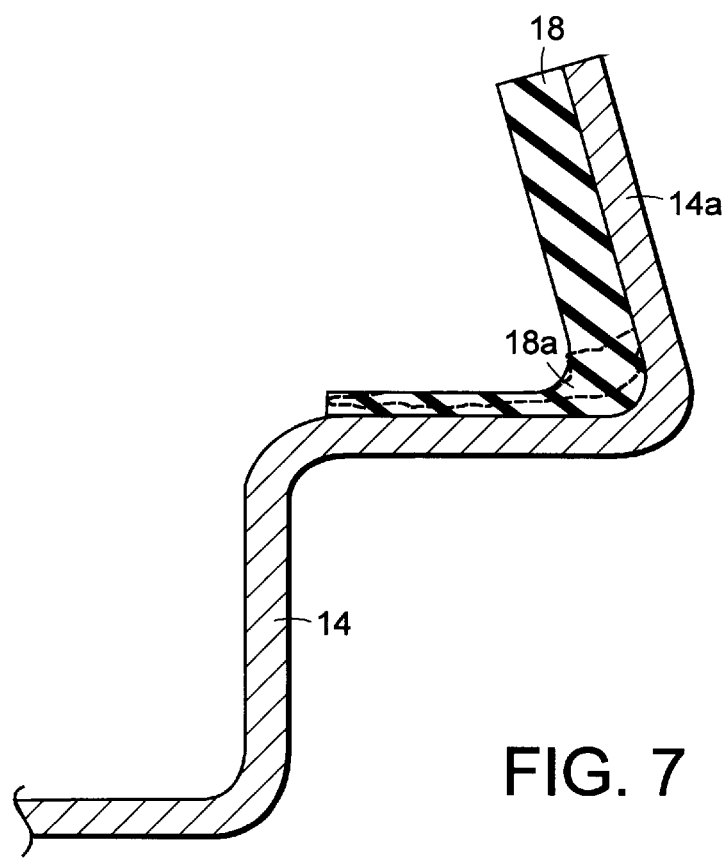
FIG. 7 is an image generated by Finite Element Analysis of a conventional aluminum backcap and a conventional epoxy seal subjected to a temperature change of −40° F.

From the foregoing analyses, it will be understood that the greater the difference between the CTE of the epoxy seal and the CTE of the backcap, the greater the stress will be on the seal due to temperature changes. In order to further prove that the CTE of the glass has little or no effect on seal separation, the analysis of FIG. 4 was repeated with the glass removed from the model. The results of this fourth analysis are depicted in FIG. 7 which indicates that the epoxy and backcap combination is the major contributor to the backcap deflection seen during the two previous analyses. As seen in FIG. 7, the upper portion 14a of the backcap 14 is deflected inward and tensile stress is exhibited on the lower portion 18a of the epoxy seal 18. The deflection and stress are caused by the epoxy 18 contracting more than the backcap 14.

Based on all of the foregoing analysis, it is believed that the backcap restricts the free expansion and contraction of the epoxy, therefore inducing stress in both parts. Conversely, if the backcap and epoxy moved uniformly, i.e. if the CTE of the epoxy were substantially the same as the CTE of the backcap, the bending deformation of the backcap caused by the epoxy/backcap CTE mismatch would be eliminated. This, in turn, would reduce the stress in the epoxy to zero.

Figure 8:
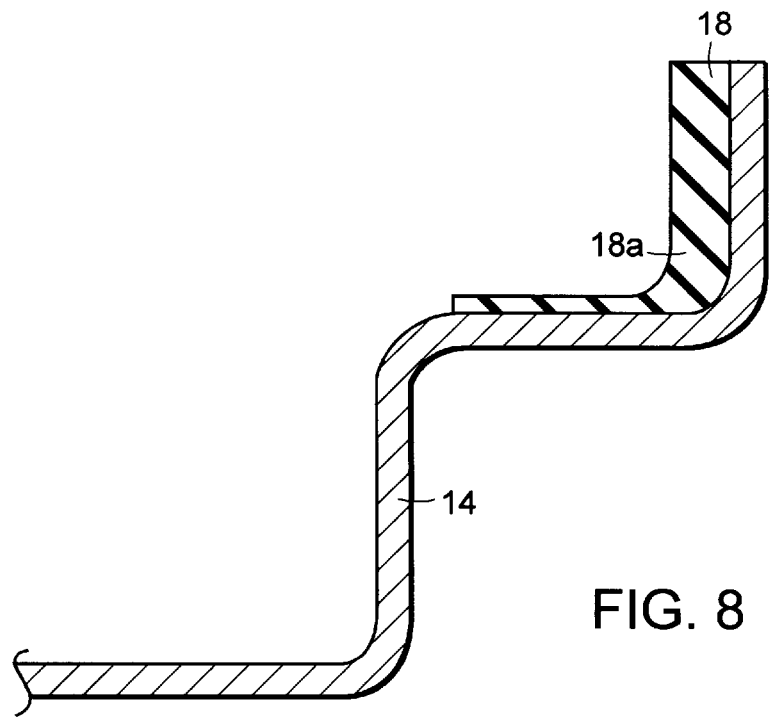
FIG. 8 is an image generated by Finite Element Analysis of a conventional aluminum backcap and an epoxy seal according to the invention subjected to a temperature change of −40° F.

With the previous results in mind, the analysis of FIG. 7 was repeated but with the CTE of the epoxy 18 modified to match the CTE of the backcap 14. The results of this fifth analysis are depicted in FIG. 8 which indicates a significant reduction of the stress in the seal. As seen in FIG. 8, at the lower portion 18a of the seal 18, the tensile stress was reduced to zero as predicted.

Figure 9:
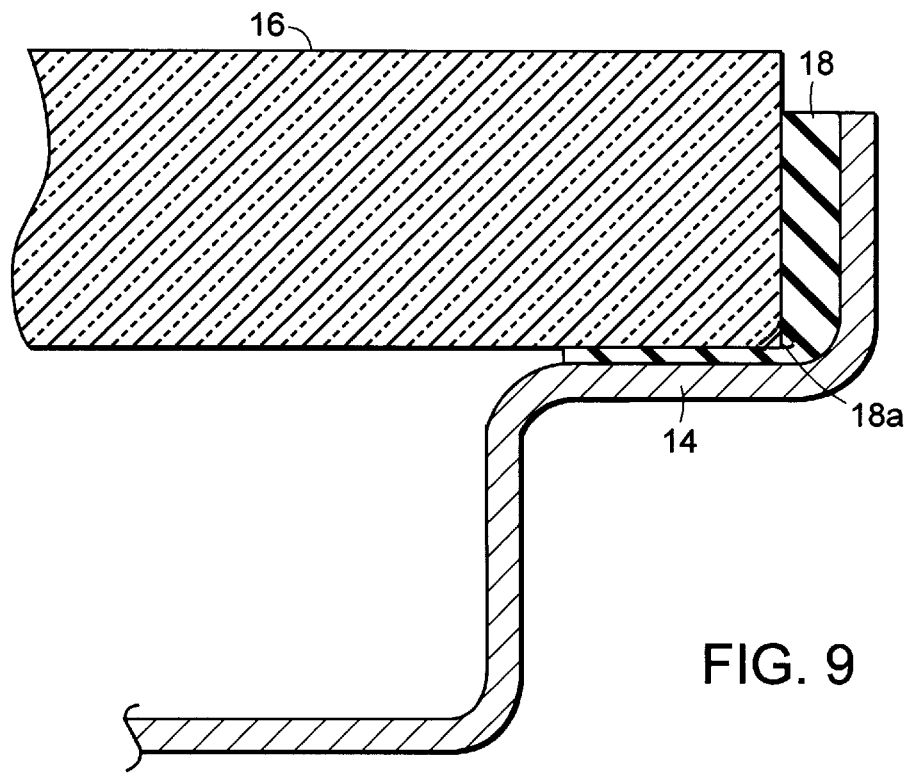
FIG. 9 is an image generated by Finite Element Analysis of a scintillation crystal module with an epoxy seal according to the invention subjected to a temperature change of −40° F.

Finally, the analysis of FIG. 4 was repeated but with the CTE of the epoxy modified to match the CTE of the backcap. The results of this fifth analysis are depicted in FIG. 9 which indicates a significant reduction of the stress in the seal. As seen in FIG. 9, at the lower portion 18a of the seal 18, the tensile stress was reduced from a value of 796 psi (FIG. 4) to 270 psi. This represents a 66% decrease in the seal stress. The results of the foregoing analyses suggest that while the difference in CTE between the glass and the backcap is a factor in seal separation, the difference in CTE between the backcap and the epoxy seal is a much more significant factor.

Following the analyses described above, several epoxy systems were examined to determine which epoxies might be utilized in practicing the invention. It was discovered that the CTE of various epoxy systems can be adjusted by selecting an appropriate catalyst, by adjusting the resin:catalyst ratio, and by doping the epoxy system. The presently preferred epoxy system is a STYCAST® 2850 FT system available from W. R. Grace & Co. Using "catalyst 9" according to the manufacturer's directions, the cured epoxy has a CTE of approximately $19.4 \times 10^{-6}$ in/in° F. Using "catalyst 11" according to the manufacturer's directions, the cured epoxy has a CTE of approximately $17.33 \times 10^{-6}$ in/in° F. Both of these epoxies perform well when used as a gamma camera seal.

Figure 10:
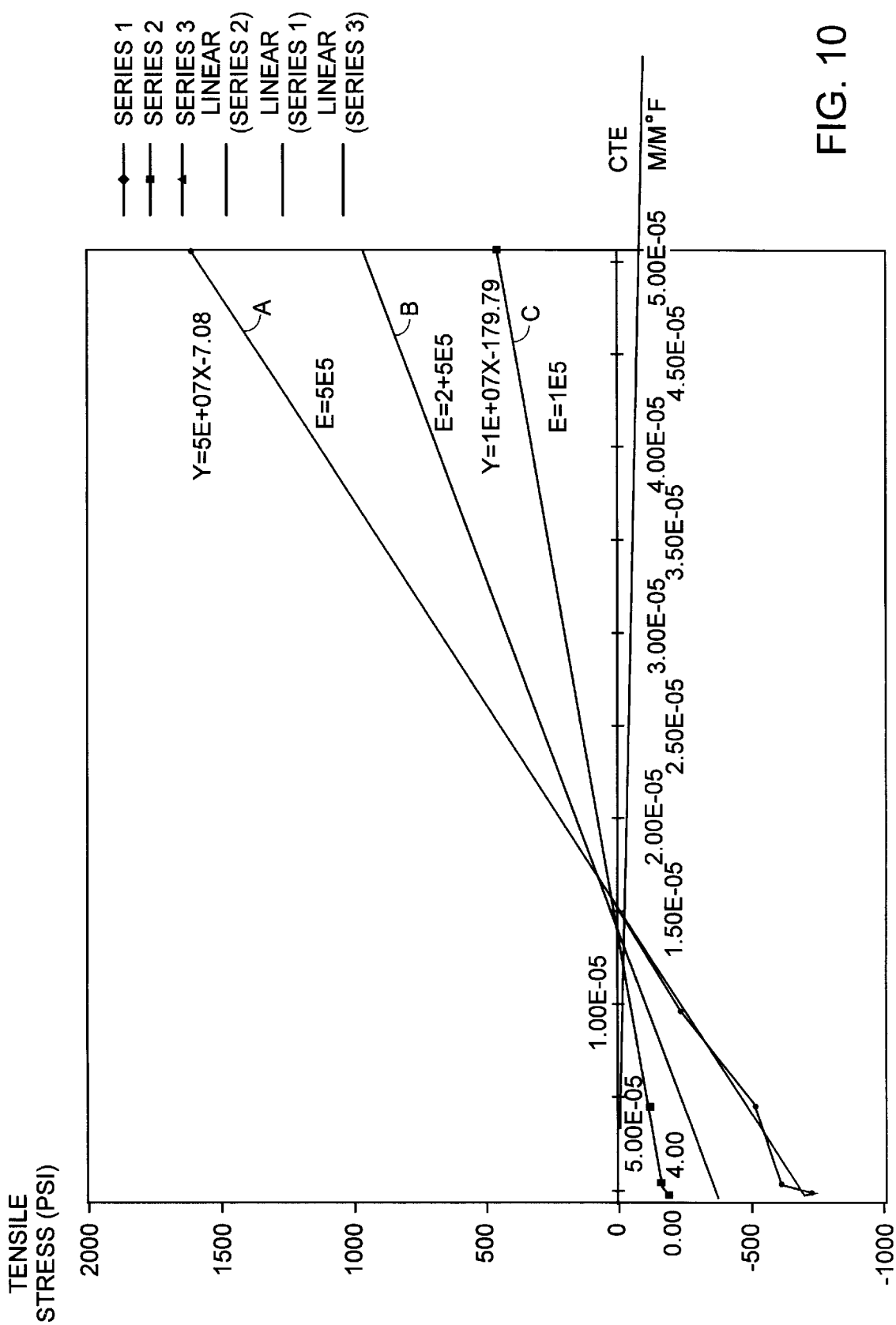
FIG. 10 is a graph of tensile stress as a function of CTE of epoxy for epoxies with three different moduli of elasticity when subjected to a temperature change of −40° F.

In order to further test the hypothesis of the invention, the effects of thermal expansion were analyzed using Finite Element Analysis tools on epoxies have different moduli of elasticity. FIG. 10 is a graph of tensile stress as a function of CTE of epoxy for epoxies with three different moduli of elasticity when subjected to a temperature change of −40° F. The line "A" was extrapolated from an analysis conducted on an epoxy (epoxy A) having a modulus of elasticity $E=5.0 \times 10^5$ psi. The line "B" was extrapolated from an analysis conducted on an epoxy (epoxy B) having a modulus of elasticity $E=2.5 \times 10^5$ psi. The line "C" was extrapolated from an analysis conducted on an epoxy (epoxy C) having a modulus of elasticity $E=1.0 \times 10^5$ psi. As mentioned above, the typical CTE of an epoxy used in state of the art gamma cameras is $43 \times 10^{-6}$. At this CTE, the epoxy A exhibited a tensile stress of approximately 1250 psi at a single point (node in the Finite Element Module) when subjected to a temperature change of −40° F. By choosing an epoxy with a lower modulus of elasticity, but with the same CTE, the tensile stress could be reduced but not eliminated. For example, the epoxy B exhibited a tensile stress of approximately 800 psi and the epoxy C exhibited a tensile stress of approximately 300 psi. However, regardless of the modulus of elasticity, when the CTE of the epoxy was adjusted to approximately match the CTE of the aluminum backcap, the tensile stress was virtually eliminated. More particularly, as shown in FIG. 10, where the CTE of the epoxy was between $10 \times 10^{-6}$ and $20 \times 10^{-6}$, the tensile stress was always lower than what could be achieved by adjusting the modulus of elasticity without adjusting the CTE.

There have been described and illustrated herein several embodiments of a gamma camera seal and a gamma camera incorporating the same. While particular embodiments of the invention have been described, it is not intended that the invention be limited thereto, as it is intended that the invention be as broad in scope as the art will allow and that the specification be read likewise. Thus, while particular epoxy systems have been disclosed, it will be appreciated that other epoxy systems could be utilized if they provide an epoxy with a suitable CTE. Also, while a particular gamma camera assembly has been shown, it will be recognized that other types of camera assemblies could be used with an appropriate epoxy seal according to the invention. It will therefore be appreciated by those skilled in the art that yet other modifications could be made to the provided invention without deviating from its spirit and scope as so claimed.

I claim:

1. A scintillation crystal module comprising:
   a) a metal backcap having a first coefficient of thermal expansion;
   b) an optically transparent window;
   c) a scintillation crystal located between said optically transparent window and said metal backcap; and
   d) an epoxy seal located between said optically transparent window and said metal backcap, said epoxy seal hermetically sealing said module, wherein
      said epoxy seal has a second coefficient of thermal expansion which is closely matched to said first coefficient of thermal expansion.

2. A scintillation crystal module according to claim 1, wherein:
   said metal backcap is aluminum.

3. A scintillation crystal module according to claim 2, wherein:

said optically transparent window is K+ glass.

4. A scintillation crystal module according to claim 2, wherein:

said first coefficient of thermal expansion is approximately $13.3 \times 10^{-6}$ in/in° F., and said second coefficient of thermal expansion is between approximately $9 \times 10^{-6}$ in/in° F. and $20 \times 10^{-6}$ in/in° F.

5. A scintillation crystal module according to claim 1, further comprising:

e) an array of photo detectors optically coupled to said optically transparent window.

6. A scintillation crystal module according to claim 1, wherein:

said epoxy seal has a modulus of elasticity of between approximately $1 \times 10^5$ and $5 \times 10^5$.

7. A method of making a scintillation crystal module, comprising:

a) bonding a scintillation crystal to an optically transparent window;

b) obtaining a metal backcap having a first coefficient of thermal expansion;

c) obtaining an epoxy with a second coefficient of thermal expansion, said second coefficient of thermal expansion being approximately equal to said first coefficient of thermal expansion; and d) bonding the transparent window to the metal backcap with the epoxy.

8. A method according to claim 7, wherein:

said obtaining an epoxy comprises obtaining a resin and a catalyst and preparing the epoxy.

9. A method according to claim 8, wherein:

said bonding the transparent window comprises curing the epoxy.

10. A method according to claim 7, further comprising:

e) obtaining an array of photo detectors; and f) optically coupling the array to the transparent window.

* * * * *